(No Model.)

J. F. SCHAFER.
CHECK, DRAFT, OR THE LIKE.

No. 493,223. Patented Mar. 7, 1893.

Witnesses
Fred B. Pasker.
Henry B. Bolton

Inventor
J. F. Schafer
by F. B. Brock
Attorney

THE NORRIS PETERS CO., PHOTO-LITHO., WASHINGTON, D. C.

UNITED STATES PATENT OFFICE.

JOHN F. SCHAFER, OF SAN FRANCISCO, CALIFORNIA.

CHECK, DRAFT, OR THE LIKE.

SPECIFICATION forming part of Letters Patent No. 493,223, dated March 7, 1893.

Application filed October 1, 1891. Serial No. 407,411. (No model.)

*To all whom it may concern:*

Be it known that I, JOHN F. SCHAFER, a citizen of the United States, residing at San Francisco, in the county of San Francisco and State of California, have invented certain new and useful Improvements in Checks, Drafts, or the Like; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in negotiable paper.

The object of my improvements is to provide a sure means of identifying checks, drafts, stock, bonds, notes, and all other commercial exchange against fraud, defalcation and embezzlement. For these purposes my invention consists in the following arrangement and construction which will first be fully described in detail and the points of novelty then set forth and claimed.

Figure 1:
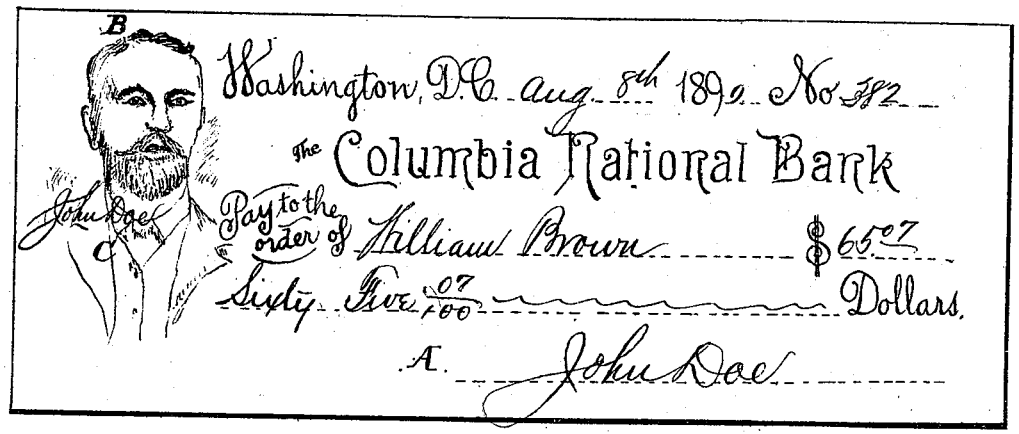
Figure 2:
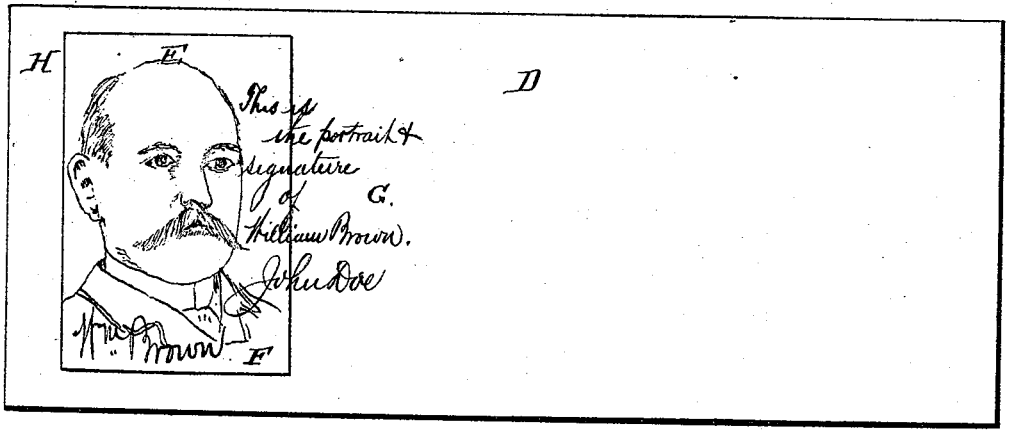

Figure 1 of the drawings represents the face of a check, draft, or the like. Fig. 2 is a reverse or back view of the same.

A represents the face of the draft, comprising the name of the bank, a date line, an order to pay to the drawee or bearer, a line for the drawee, a line for the amount to be paid (both in figures and the written amount) and a line for the signature of the drawer thereof.

B represents a photograph of the drawer of the check, printed preferably in blue ink so that it can not be rephotographed.

C is a facsimile of drawer's signature which is also preferably photographed or printed with the photo B.

D is the back of the check A. For the purpose of identification and provision against fraud, a photograph E and facsimile signature F of the drawee or owner of the check is preferably pasted or affixed to the back D, and an indorsement G as to the identity of said photograph and signature is engrossed both upon the paster H and the body of the check by being written across the edge of the paster upon the check. The photo of the drawee or owner and the facsimile signature are also preferably printed in blue ink to prevent rephotographing; and I may also print them directly upon the check without the intervention of the paster, if desired.

I may use my invention in connection with drafts, deeds, wills, acknowledgements, affidavits, powers of attorney, letters, notes, bills, bonds, stock, and other paper of like import.

In giving written options on letter paper, and all other memoranda or information, it is highly important that the signer's name may be verified by his photograph and signature, both photographed or printed upon the paper upon which his autograph is written.

I claim as new—

1. A check, draft, or the like, having a photograph and facsimile signature of the drawer on its face, a photograph and facsimile signature of the drawee or owner printed upon a paster and affixed to the back of the check by an adhesive, an identification of said photograph and signature upon said adhesive paster by the drawer, consisting of said drawer's signature partly upon and across both the paster and the body of the back of the check.

2. A paper of the character described, having both a photograph of the person and a photograph of his signature thereon to prevent counterfeiting, substantially as described.

In testimony whereof I affix my signature in presence of two witnesses.

JOHN F. SCHAFER.

Witnesses:
M. S. TEMPLETON,
THOS. M. SCOTT.